(12) United States Patent  
Chen et al.

(10) Patent No.: US 6,583,983 B1
(45) Date of Patent: Jun. 24, 2003

(54) COMPUTER CASING WITH FASTENING DEVICE

(75) Inventors: Yun Lung Chen, Taipei (TW); Yu-Tai Liu, Taipei (TW); Jung Chi Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 17 days.

(21) Appl. No.: 09/993,461

(22) Filed: Nov. 14, 2001

(51) Int. Cl.[7] ................................................ H05K 7/16
(52) U.S. Cl. ...................... 361/683; 248/918; 16/340; 439/152
(58) Field of Search .......................... 361/383, 680–682, 361/686; 248/917–923, 398; 16/340; 312/223.1–223.6; 439/53, 152, 157

(56) References Cited

U.S. PATENT DOCUMENTS 6,275,376 B1 * 8/2001 Moon ........................ 361/683
6,456,486 B1 * 9/2002 Frame et al. ................ 361/684
6,460,948 B2 * 10/2002 Roesner et al. ........... 312/233.1

* cited by examiner

*Primary Examiner*—Darren Schuberg
*Assistant Examiner*—Hung Van Duong
(74) *Attorney, Agent, or Firm*—WeiTe Chung

(57) ABSTRACT

A computer casing (100) includes a cage (90), a side panel (10), a top panel (30), and a fastening device (60) for securing the side panel to the top panel. The side panel has a plurality of hooks (15). The top panel defines a sliding slot (38) slidably accommodating the fastening device. A plurality of recesses (48) defined in one side of the top panel is in communication with corresponding through holes (46) defined in one slot wall (44) bordering the sliding slot. A plurality of through openings (70) is defined through the fastening device. A spring (74) is placed over a cross-shaped nub (72) on one end of the fastening device. When the hooks are extending into the through openings, the hooks drive the fastening device to compress the spring. The spring then decompresses, causing the hooks to snappingly engage the side panel with the top panel.

12 Claims, 7 Drawing Sheets

COMPUTER CASING WITH FASTENING DEVICE

BACKGROUND OF THE INVENTION

1. Field of the Invention

The present invention relates to computer casings, and in particular to computer casings having fastening devices for readily securing side panels to the casings and readily detaching the side panels from the casings.

2. Related Art

Many different means and devices are used to secure side panels to computer casings. One conventional means is to simply screw a side panel directly to a computer casing. However, this requires a screwdriver. Installation and removal of the side panel is unduly cumbersome and time-consuming.

As computers have proliferated and improved, various other means have been developed to facilitate installation and removal of side panels. One such means is shown in Taiwan Patent Application No. 87213422. A plurality of hooks is inwardly formed from a flange of one side of a side panel of a computer, for engaging with corresponding slots in a rear panel of the computer. An opposite side of the side panel forms an L-shaped flange. A plurality of apertures is defined in the L-shaped flange, for extension of screws thereinto. Because screws are needed to fix the side panel to the computer casing, installation and removal of the side panel is still unduly cumbersome and time-consuming.

An improved fastening device for securing a side panel to a computer casing which overcomes the above-mentioned problems is desired.

BRIEF SUMMARY OF THE INVENTION

Accordingly, an object of the present invention is to provide a computer casing having a fastening device for readily securing a side panel to the computer casing and readily detaching the side panel therefrom.

Another object of the present invention is to provide a computer casing having a fastening device which firmly fixes a side panel to the computer casing.

To achieve the above-mentioned objects, a computer casing comprises a cage, a side panel, a top panel and a fastening device for securing the side panel to the top panel. The side panel has a plurality of hooks. The top panel defines a sliding slot slidably accommodating the fastening device. A plurality of recesses defined in one side of the top panel is in communication with corresponding through holes defined in one slot wall bordering the sliding slot. A plurality of through openings is defined through the fastening device. A spring is placed over a cross-shaped nub on one end of the fastening device. When the hooks are extended into the through openings of the fastening device, the hooks drive the fastening device to compress the spring. When the hooks have completely entered the through openings, the spring decompresses and pushes the fastening device back to its original position. The hooks thus snappingly engage the side panel with the top panel.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
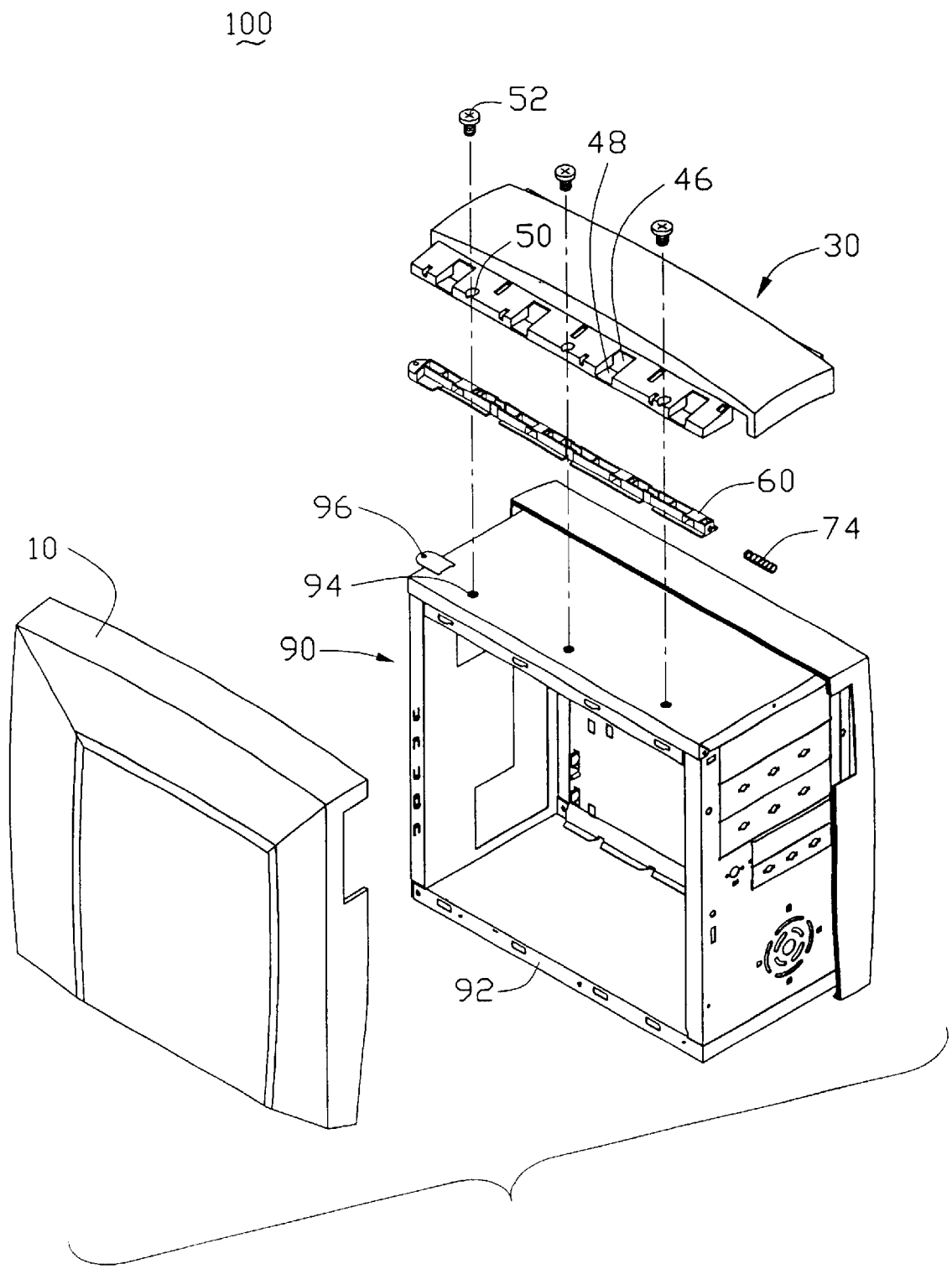
FIG. 1 is an exploded view of a computer casing in accordance with the present invention.

Referring to FIG. 1, a computer casing 100 of the present invention includes a cage 90, a side panel 10, a top panel 30 and a fastening device 60. A spring 74 and a plurality of screws 52 are used in assembly of the computer casing 100.

The cage 90 comprises a lower flange 92, a plurality of spaced screw holes 94, and an aperture 96. The lower flange 92 is disposed at a bottom of one side of the cage 90, and connects between a front end and a rear end of the cage 90. The screw holes 94 are defined near a side edge of a top plate of the cage 90, which side edge corresponds to the side of the cage 90 where the lower flange 92 is disposed. The aperture 96 is defined in a tab (not labeled) of the cage 90 that projects generally coplanarly from a rear of the top plate of the cage 90.

Figure 2:
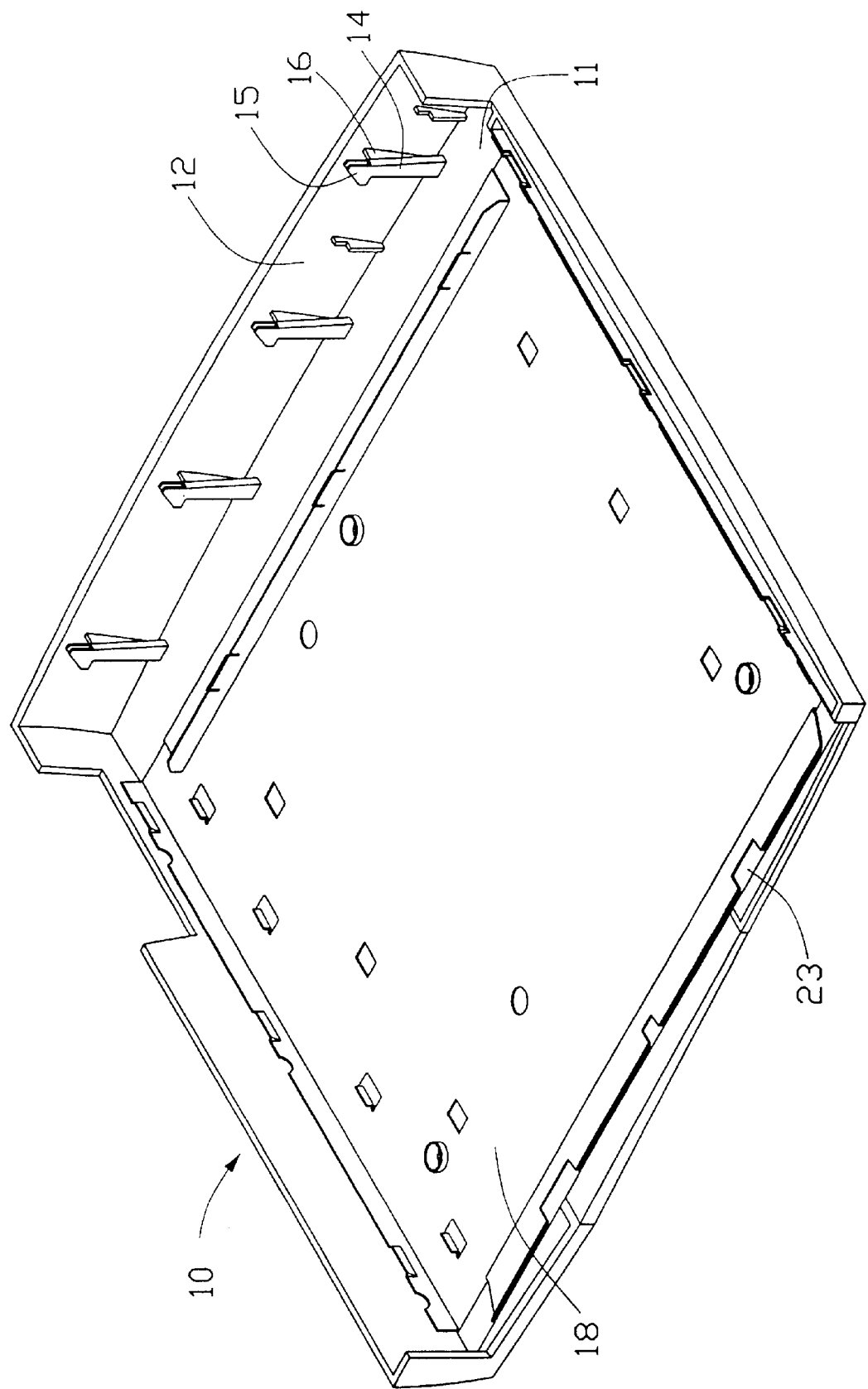
FIG. 2 is a perspective view of a side panel of the computer casing of FIG. 1.

Referring also to FIG. 2, the side panel 10 comprises a side plate 11 and a shield plate 12 extending perpendicularly from a top edge of the side plate 11. A plurality of protrusions 14 extends perpendicularly from the side plate 11 near the shield plate 12. A reinforcing rib 16 connects each protrusion 14 to an inner side of the shield plate 12. A hook 15 is formed on a free end of each protrusion 14. All the hooks 15 are oriented in a same direction, and are aligned to be parallel to the shield plate 12. A steel plate 18 is attached to an inner side of the side plate 11 by conventional means. A lower portion of the steel plate 18 is folded upwardly and inwardly and then downwardly and inwardly, thereby defining a space 23 for receiving the lower flange 92 of the cage 90.

Figure 4:
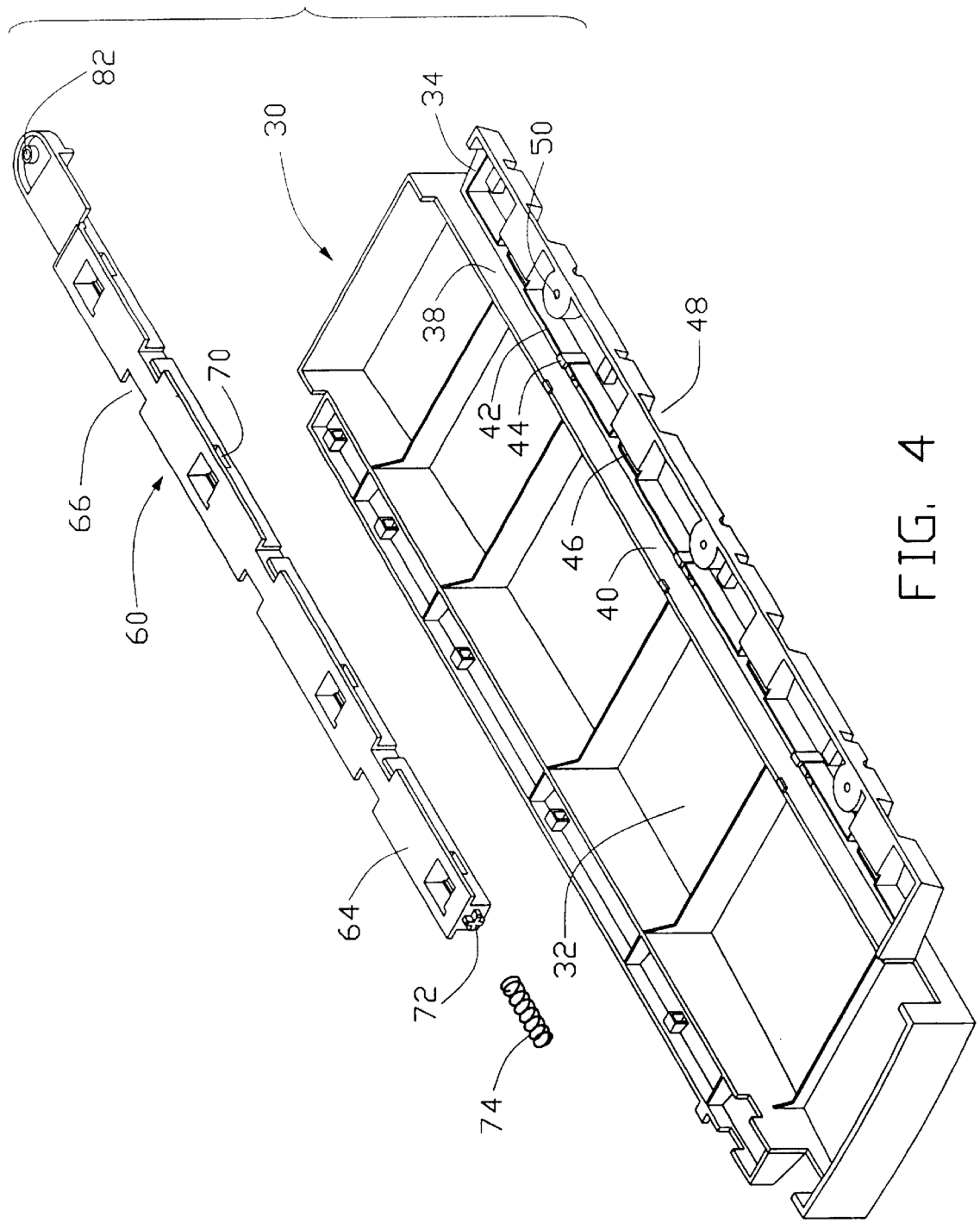
FIG. 4 is a perspective view of the fastening device ready to be attached to a top panel of the computer casing of FIG. 1.

Referring particularly to FIG. 4, the top panel 30 comprises a main body 32, and a connecting body 34 formed on one side of the main body 32. A sliding slot 38 is defined between a slot wall 40 of the main body 32 and a slot wall 42 of the connecting body 34. Three pairs of opposing stops 44 are formed on opposite longitudinal edges of the slot walls 40, 42. Each stop 44 in each pair of stops 44 opposes the other stop 44 across the sliding slot 38. A plurality of through holes 46 is defined in the slot wall 42, in communication with the sliding slot 38. A plurality of recesses 48 is defined in a junction of a top surface and an outmost longitudinal side surface of the connecting body 34. Each through hole 46 is in communication with a corresponding recess 48. A plurality of bores 50 is defined in the connecting body 34, corresponding to the screw holes 94 of the cage 90.

Figure 3:
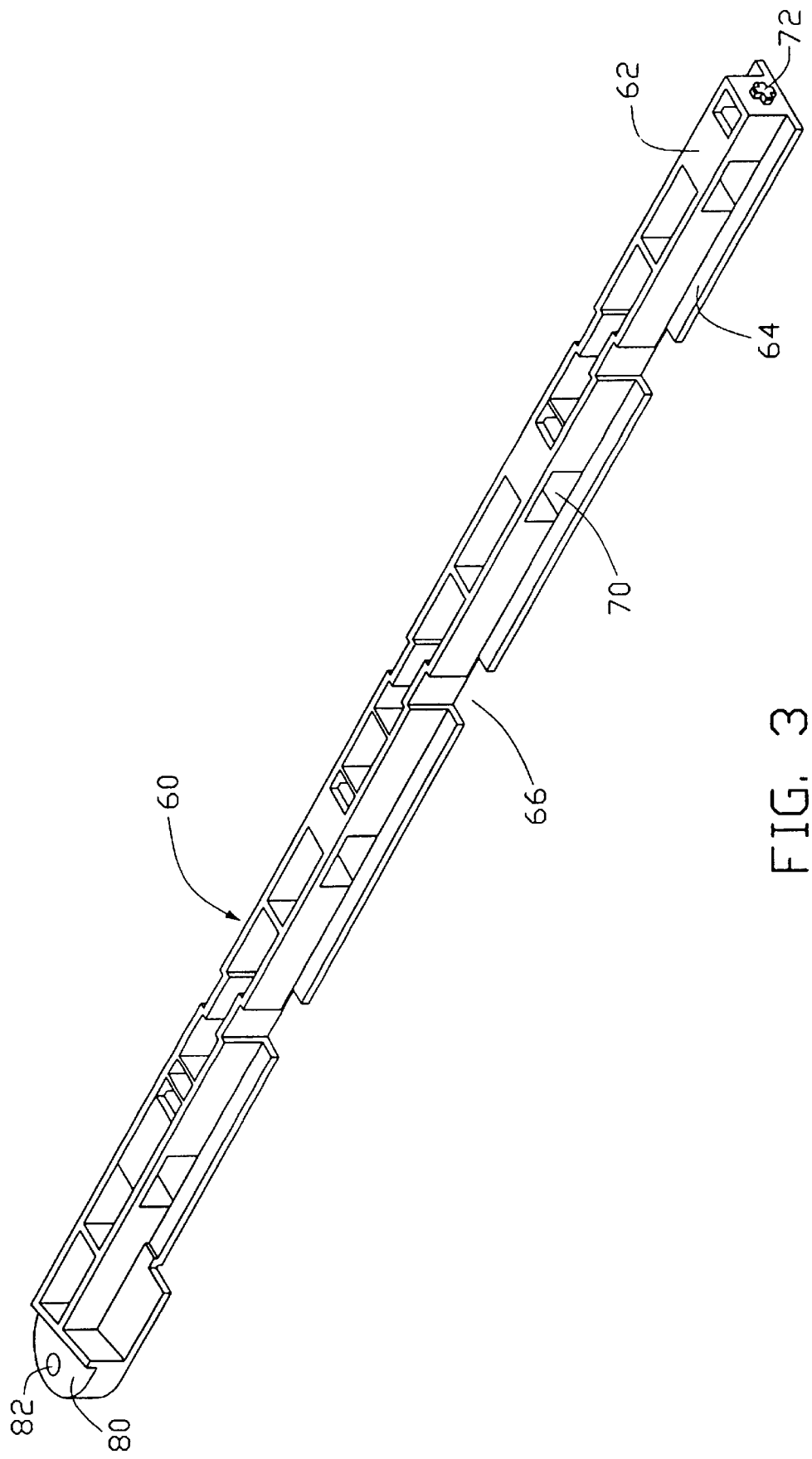
FIG. 3 is a perspective view of a fastening device of the computer casing of FIG. 1.

Referring particularly to FIGS. 3 and 4, the fastening device 60 is elongate and integrally made from plastic material. The fastening device 60 comprises an elongate base 64, and an elongate sliding body 62 adjoining the base 64. Three pairs of cutouts 66 are defined in opposite sides of the base 64, for movably receiving the stops 44 of the top panel 30 and thereby preventing the sliding body 62 from sliding too far. The sliding body 62 is generally hollow. A plurality of through openings 70 is defined between opposite longitudinal sides of the sliding body 62. The through openings 70 correspond to the through holes 46 of the connecting body 34. A cross-shaped nub 72 protrudes from one end of the fastening device 60. An operating portion 80 is formed at an opposite end of the fastening device 60. The operating portion 80 has a semicircular profile. A through aperture 82 is defined in the operating portion 80.

Figure 5:
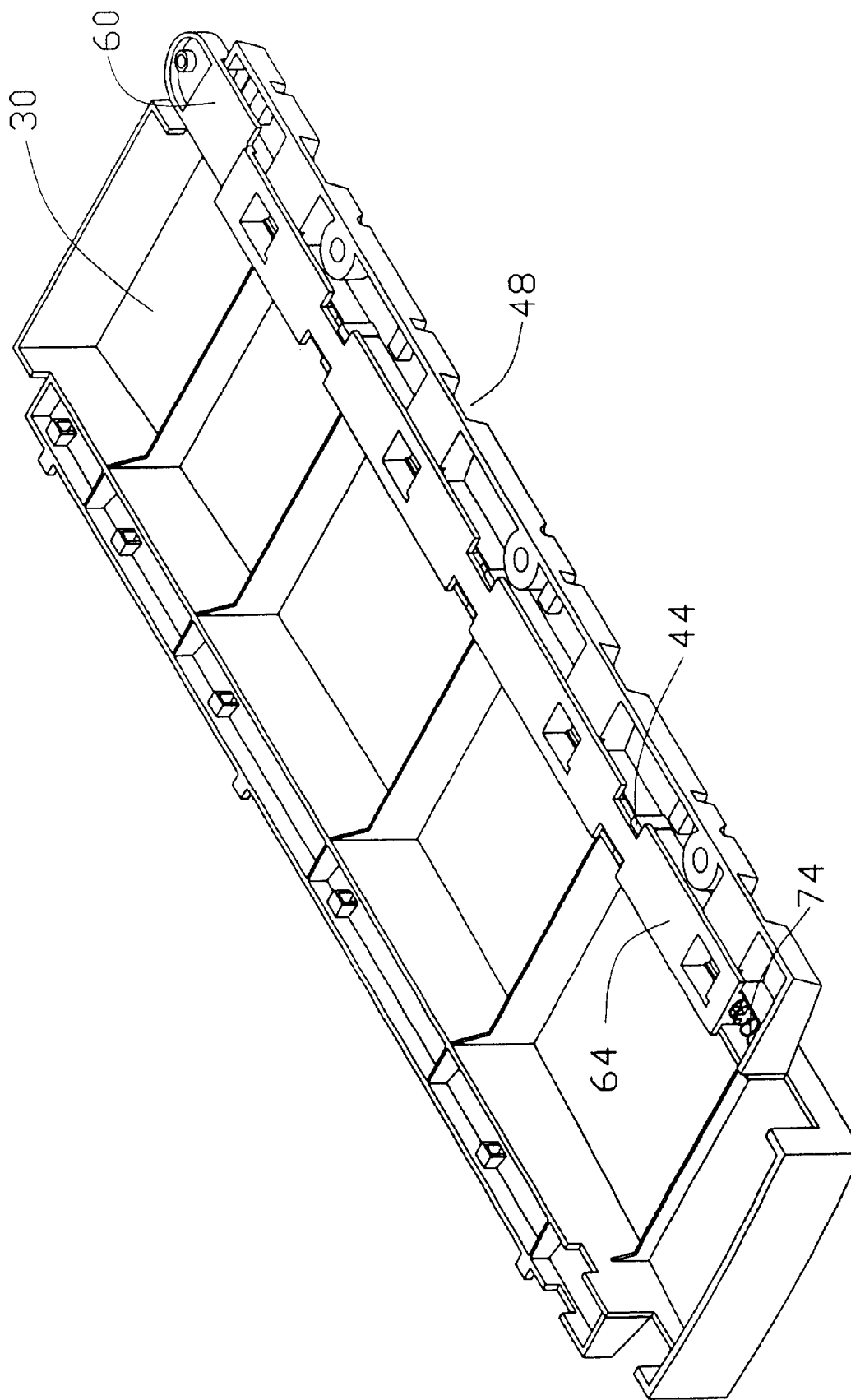
FIG. 5 is similar to FIG. 4, but showing the fastening device attached to the top panel.

Referring also to FIG. 5, in attaching the fastening device 60 to the top panel 30, the sliding body 62 of the fastening device 60 is placed into the sliding slot 38 of the top panel 30. The base 64 of the fastening device 60 abuts against bottom edges of the slot walls 40, 42 of the top panel 30. The stops 44 of the top panel 30 are movably received in the cutouts 66 of the fastening device 60. The spring 74 is placed over the cross-shaped nub 72. A free end of the spring 74 presses a wall of the top panel 30 located at a front end of the sliding slot 38. The operating portion 80 of the fastening device 60 protrudes out from the sliding slot 38. The through openings 70 of the fastening device 60 are in alignment with the corresponding recesses 48 of the top panel 30.

Figure 6:
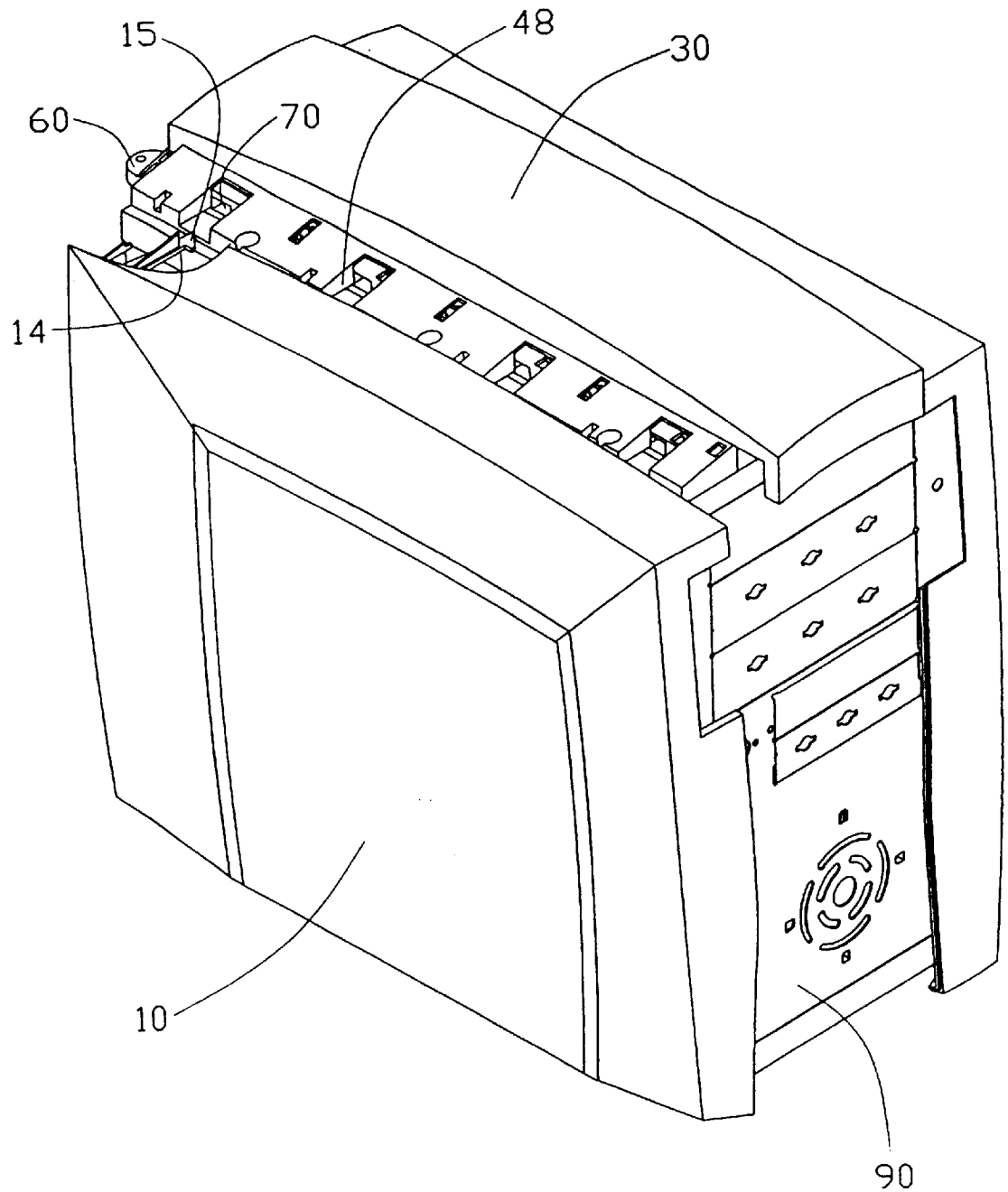
FIG. 6 is a substantially assembled view of FIG. 1, showing the side panel ready to be attached to one side of the computer casing.
Figure 7:
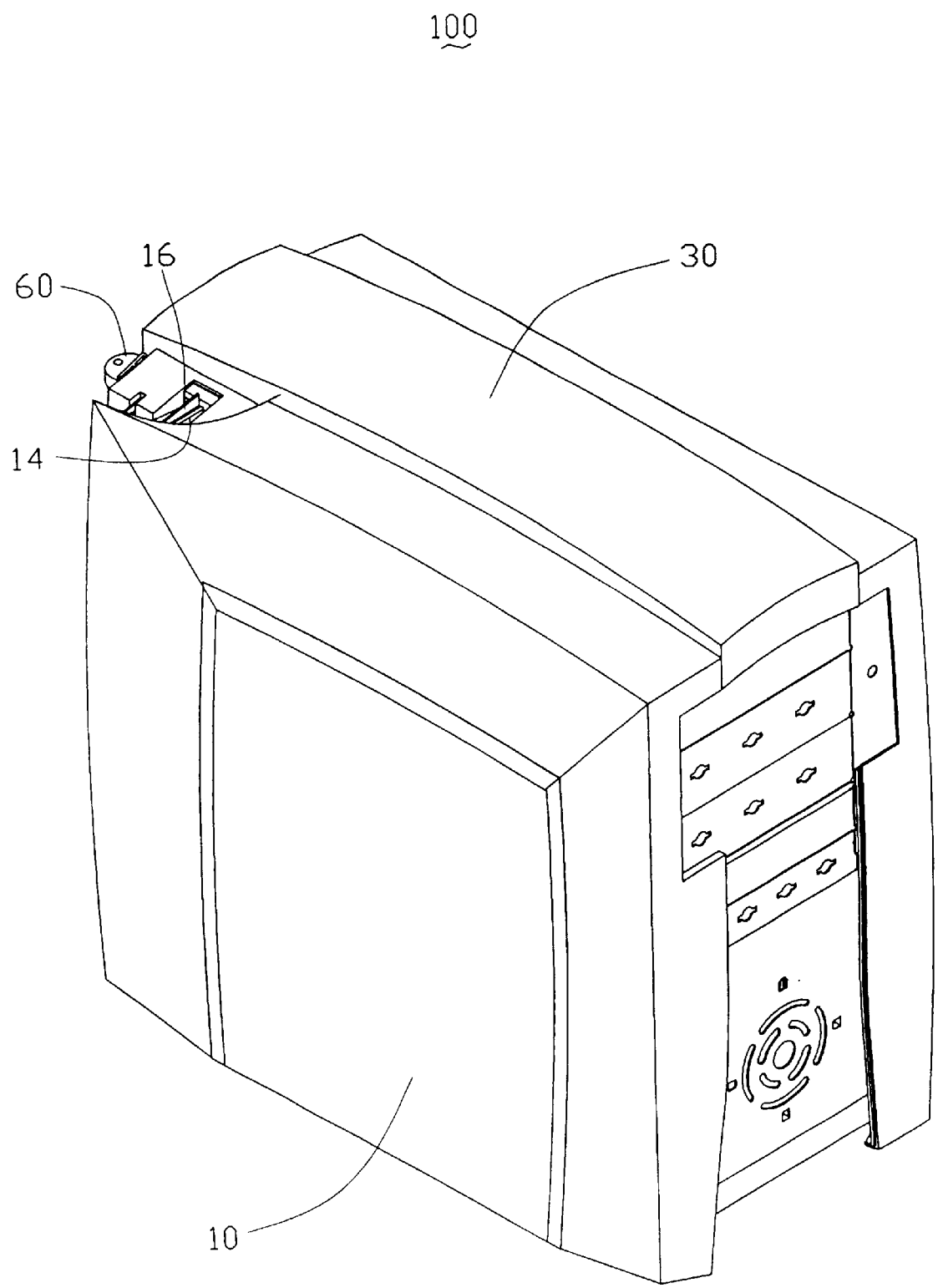
FIG. 7 is a fully assembled view of FIG. 1, showing the side panel attached to the side of the computer casing.

In assembly of the computer casing 100, the combined top panel 30 and fastening device 60 is mounted on top of the cage 90. The screws 52 are extended through the holes 50 of the top panel 30 and engaged in the screw holes 94 of the cage 90. Referring also to FIGS. 6 and 7, the side panel 10 is placed on one side of the cage 90. The lower flange 92 of the cage 90 is received in the space 23 of the steel plate 18 of the side panel 10. The protrusions 14 of the side panel 10 are extended into the recesses 48 of the top panel 30, and the hooks 15 of the protrusions 14 are extended into the corresponding through openings 70 of the fastening device 60. Slanted surfaces (not labeled) of each of the hooks 15 abut against a longitudinal wall of the sliding body 62 adjacent the corresponding openings 70, and force the sliding body 62 to slide along the sliding slot 38 of the top panel 30. The spring 74 is compressed. When the hooks 15 have completely entered the corresponding openings 70, the spring 74 decompresses and pushes the fastening device 60 back to its original position. The hooks 15 thus snappingly engage the side panel 10 with the top panel 30. The operating portion 80 of the fastening device 60 protrudes out from the computer casing 100. The computer casing 100 can be locked by extending a padlock (not shown) through the through aperture 82 of the operating portion 80 and the aperture 96 of the cage 90.

In disassembly, the operating portion 80 of the fastening device 60 is pushed inwardly to release the hooks 15 of the side panel 10 from engagement in the through openings 70 of the fastening device 60. The side panel 10 is then easily removed from the cage 90.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer casing comprising:

a computer cage;

a top panel attached to a top of the cage, the top panel having a sliding slot defined therein, a plurality of through holes defined in communication with the sliding slot, and a plurality of recesses defined in one side of the top panel and in communication with corresponding through holes;

a fastening device slidably accommodated in the sliding slot of the top panel, a plurality of through openings being defined through the fastening device in alignment with the through holes of the top panel;

a resilient member positioned on one end of the fastening device to provide recovery force for the fastening device; and a side panel attached to one side of the cage, the side panel comprising a plurality of hooks, wherein when the hooks are extended through the recesses and through holes of the top panel, the hooks drive the fastening device to slide along the sliding slot and compress the resilient member, and when the hooks have entered the through openings, the resilient member decompresses and pushes the fastening device to snappingly engage the side panel with the top panel.

2. The computer casing as described in claim 1, wherein the side panel further comprises a steel plate attached to an inner side thereof, and a lower portion of the steel plate is folded to define a space receiving a lower flange of the cage.

3. The computer casing as described in claim 1, wherein the fastening device comprises a base, the top panel has two slot walls on opposite sides of the sliding slot, and the base abuts against edges of the slot walls of the top panel.

4. The computer casing as described in claim 1, wherein a nub is formed on said one end of the fastening device, and the resilient member is placed over the nub.

5. The computer casing as described in claim 1, wherein an opposite end of the fastening device has an operating portion, and a through aperture is defined in the operating portion for extension of a lock therethrough.

6. The computer casing as described in claim 1, wherein the resilient member is a spring.

7. The computer casing as described in claim 3, wherein at least one cutout is defined in the base of the fastening device to movably receive at least one corresponding stop formed on the edge of at least one of the slot walls of the top panel, thereby limiting sliding of the fastening device.

8. A computer casing, comprising:

a cage;

a panel attached to the cage, the panel having a plurality of hooks; and a fastening device securing the panel to the cage and being slidable on the cage, the fastening device comprising a plurality of openings defined therethrough, a resilient member being compressed between one end of the fastening device and the cage, wherein when the hooks are extended into the openings, the resilient member decompresses and pushes the fastening device to snappingly engage the panel with the cage.

9. The computer casing as described in claim 8, wherein the fastening device is slidably accommodated in a sliding slot of a top panel of the computer casing.

10. The computer casing as described in claim 9, wherein the top panel has a plurality of recesses defined in communication with a plurality of through holes thereof, the through holes are defined in communication with the sliding slot, and the recesses and the through holes correspond to the openings of the fastening device.

11. The computer casing as described in claim 9, wherein at least one stop is formed on the top panel- at one slot wall of the sliding slot, and the at least one stop is movably received in at least one cutout of the fastening device to prevent the fastening device from sliding too far.

12. The computer casing as described in claim 8, wherein the resilient member is a spring.

* * * * *